United States Patent [19]

Ciepiela et al.

[11] Patent Number: 4,676,908

[45] Date of Patent: Jun. 30, 1987

[54] WASTE WATER TREATMENT

[75] Inventors: Edmund J. Ciepiela, Willowdale; Ronald L. Larocque, Markham, both of Canada

[73] Assignee: Hankin Management Services Ltd., Scarborough, Canada

[21] Appl. No.: 672,952

[22] Filed: Nov. 19, 1984

[51] Int. Cl.⁴ .............................................. C02F 9/00
[52] U.S. Cl. .................................... 210/638; 210/667; 210/669; 210/677; 210/694
[58] Field of Search ............ 210/638, 663, 665-667, 210/669, 670, 677, 694, 703-707, 765, 766, 774, 805-807, 900, 668

[56] References Cited

U.S. PATENT DOCUMENTS 3,870,033  3/1975  Faylor et al. .................... 210/669
4,395,337  7/1983  Ciepiela ........................... 210/703
4,482,459  11/1984  Shiver ............................. 210/667

Primary Examiner—Ivars Cintins
Attorney, Agent, or Firm—Sim & McBurney

[57] ABSTRACT

Waste water streams from the steam-extraction of heavy oils are treated to remove organic contaminants, suspended solids and mineral contaminants, so as to produce a purified water stream of a quality suitable for reuse in steam production. Suspended solids are removed by coagulation, flocculation and flotation, organic contaminants are removed by activated carbon adsorption, and mineral contaminants are removed by electrodialysis or reverse osmosis and ion-exchange. Thermal economy also is effected by passing the purified water stream in heat exchange relation with the waste water stream after suspended solids removal.

19 Claims, 1 Drawing Figure

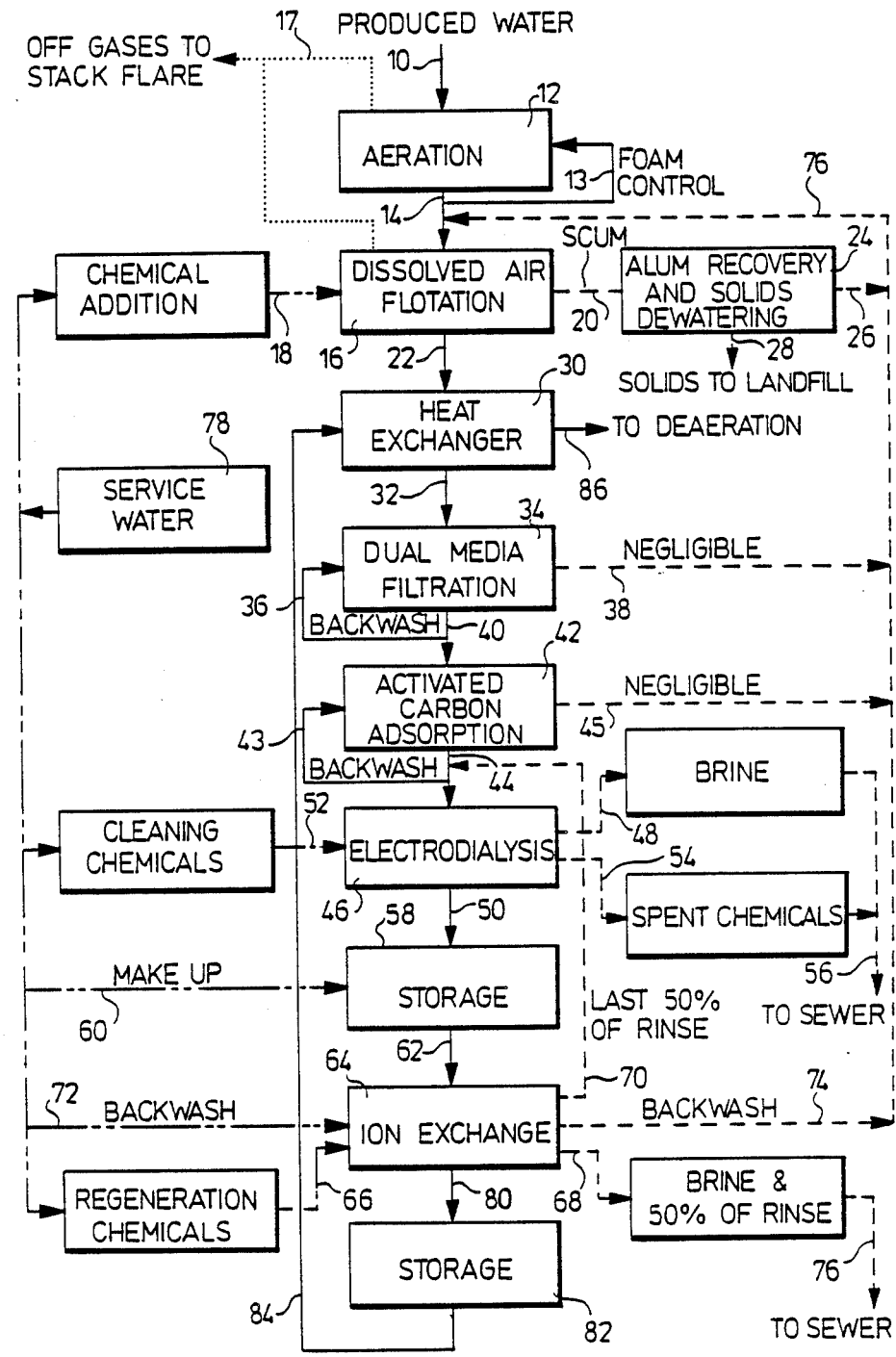

WASTE WATER TREATMENT

FIELD OF INVENTION

The present invention relates to the treatment of waste water from the steam extraction of heavy crude oils to provide water of boiler quality for use in the generation of steam.

BACKGROUND OF THE INVENTION

Bitumen is recovered from subterranean oil sand deposits by the utilization of steam at a pressure of about 1500 to 2000 psi to render the bitumen flowable and the removal of the bitumen from the deposit in suspension in hot water under the influence of the steam pressure. After separation of the bitumen from the aqueous phase at the surface, there is left a waste water known as "brackish water". This oil-recovery process is carried out at Peace River, Alberta, Canada by Shell Oil and at Cold Lake, Alberta, Canada by Esso. The brackish water contains considerable mineral concentrations and also residual hydrocarbons both of which inhibit reutilization of the water for steam production, since the minerals scale the reboiler tubes and the hydrocarbons cause fouling of boiler parts. Currently, the waste water stream along with other produced waters are disposed of into deep well subterranean storage.

The volume of water required for steam extraction is substantial, amounting to approximately 3 to 9 barrels of water per barrel of bitumen recovered. The inability to use the brackish water for steam regeneration imposes a considerable strain on the limited resources of the region and also necessitates disposal in an environmentally-safe manner.

In U.S. Pat. No. 4,395,337, assigned to the assignee hereof, the disclosure of which is incorporated herein by reference, there is described a procedure for the treatment of brackish water to remove contaminants therefrom and to render the same useful for reuse in steam generation. As set forth therein, the treatment procedure involves air flotation to remove free oil, treatment with ozone to remove residual hydrocarbons, electrodialysis reversal to remove minerals other than silica, and subsequent removal of silica.

It has now been found that the treatment with ozone leads to unforeseen difficulties. Not all dissolved organics were removed, leading to difficulties in reuse, and some dissolved organics were converted to materials which foul the electrodialysis membrane, leading to a decreased membrane life. Further, it has been found that the air flotation step often was unsuccessful in removing an acceptable proportion of the free oil and other suspended solids from the waste stream, also leading to membrane fouling and a lesser quality of product water.

It has further been found that, in many cases, the brackish water treated was in a reduced state, which inhibited removal of organics and suspended solids, leading to decreased quality of product water.

SUMMARY OF INVENTION

In accordance with the present invention, at least part of the organic material removal is effected using activated carbon adsorption. Soluble organic material present in the waste water stream is removed by adsorption into the carbon particles, leading to increased water purity and overcoming the problems of ozone treatment.

Further, in accordance with the invention, the waste water to be treated is subjected to an initial aeration to reverse any reduced state of waste water, so as to improve the efficiency of removal of organics and suspended solids. Chemical coagulents and flocculants may be added to dissolved air flotation of the aerated material to improve further the degree of separation of dissolved solids.

In the prior art system of U.S. Pat. No. 4,395,337, thermal economy is practised by subjecting the influent waste water to heat exchange. To avoid potential fouling of the heat exchanger surfaces under upset conditions, it is preferred herein to effect the heat exchange following dissolved air flotation removal of suspended solids.

BRIEF DESCRIPTION OF DRAWING

The sole FIGURE of the drawing is a schematic flow sheet of one embodiment of the invention.

DESCRIPTION OF PREFERRED EMBODIMENT

Referring to the drawing, there is illustrated therein a flow sheet of a waste water treatment system in accordance with a preferred embodiment of the invention. It will be appreciated that the detailed description of the invention which follows is directed to the specific embodiment illustrated in the drawing but that the broad scope of the invention is not limited thereto.

A waste water stream to be treated in accordance with the invention is contaminated with dissolved minerals, dissolved organic mateials, suspended solids and occluded organic liquids. Typically, the waste stream is brackish water remaining from steam extraction of heavy crude oils from subterranean deposits thereof, although any other similar waste stream may be treated in the procedure of the invention.

Sampling of a typical brackish water stream reveals some variations in the characteristics of the stream, as set forth in the following Table I:

TABLE I

| Parameter | Quantity (mg/l unless otherwise indicated) | |
|---|---|---|
| | Average | Range |
| pH | 6.97 | 6.36 to 7.92 |
| Specific gravity, gm/ml | 1.0028 | 1.0021 to 1.0050 |
| Turbidity, NTV | 185 | 56 to 310 |
| Conductivity, umhos/cm | 3250 | 2150 to 4300 |
| Dissolved solids | 2310 | 2150 to 4300 |
| Suspended solids | 156 | 22 to 624 |
| Total hardness as $CaCO_3$ | 266 | 105 to 420 |
| Alkalinity as $CaCO_3$ | 360 | 294 to 420 |
| ORP, mV | −215 | −22 to −395 |
| Oil and grease | 99 | 32 to 205 |
| Sulfide | 19 | 1.9 to 56 |
| TOC | 138 | 118 to 164 |
| COD | 1130 | 640 to 1750 |
| Calcium | 62.4 | 39.0 to 123 |
| Iron | 0.53 | 0.11 to 2.4 |
| Magnesium | 15.4 | 9.00 to 23.0 |
| Manganese | 0.074 | 0.030 to 0.159 |
| Sodium | 710 | 470 to 1290 |
| Potassium | 20.2 | 18.0 to 24.7 |
| Silica | 43 | 30 to 71 |
| Chloride | 780 | 420 to 1170 |
| Sulfate | 140 | 112 to 170 |
| Phenol | 19.5 | 19.5 |

The waste water stream in line 10 is passed to an aerator 12 for aeration of the water therein. As noted above, it has been found that, in many cases, the brackish water was in a reduced state, which inhibited efficient flocculation and suspended solids and occluded liquids removal. Aeration in aerator 12 is effected to reverse this condition. Aeration is effected by passing air bubbles therethrough in any covenient manner. Typically, the degree of aeration is sufficient when the waste water colour turns from pale yellow to deep brown and the pH is elevated to a value in the range of about 7.80 to about 8.40 from the initial range of about 6.30 to about 7.90. In addition to the pH change, the aeration step lowers the oxidation-reduction potential (ORP) and achieves a reduction in sulfide and phenol concentrations. A proportion of the aerated waste water is recycled by line 13 to maintain foam control in the aerator 12.

The aerated waste water is passed by line 14 to a dissolved air flotation device 16. Chemical additives, in the form of coagulants and flocculants, are also fed by line 18 to a flocculation chamber of the dissolved air flotation device 16. Alum typically is employed as the coagulant while a polyelectrolyte may comprise the flocculant. A slow speed, paddle-type, flocculator provides gentle mixing, thereby enhancing floc growth.

In the flotation device 16, the flocculated waste is intimately mixed with a pressurized internal recycle flow, typically about 25 to 33% of the unit throughput. The recycle stream is effluent from the flotation device saturated with air at pressures ranging from about 280 to 350 pka (about 40 to 50 psig). The pressure of the saturated effluent recycle is suddenly dropped immediately before entering the flotation tank. As the air comes out of solution, small bubbles form that attach to the floc in the mixture, causing the floc to float. The floated floc forms a scum on the surface of the flotation tank 16, which is removed by skimmers. Heavy solids that settle, rather than float, are removed from the flotation device 16 by a screw conveyer to a hopper. The combined sludge effluent from the flotation step, comprising floated and settled solids, is removed by line 20. The clarified waste water passes over a weir into an effluent well and, apart from the portion thereof which is internally recycled as described above, is removed by line 22.

The removed scum in line 22 passes to an alum recovery operation 24, wherein the scum is acidified with sulphuric acid to pH 1.5 and mixed for several hours before separating a liquid phase containing reclaimed alum from the scum solids. Recovered alum is recycled to the flotation tank 16 by line 26 while the residual solids in line 28 is disposed of as landfill.

Off gases from the aeration device 12 and also from the dissolved air flotation device 16 are vented to a stack flare or similar disposal by line 17.

The dissolved air flotation operation effected in tank 16 serves to remove at least a substantial proportion of the suspended solids and occluded oil from the aerated waste water. The procedure which is effected, involving a combination of aeration followed by dissolved air flotation in the presence of coagulants and flocculants, is in contrast with that described in the aforementioned U.S. Pat. No. 4,395,337 wherein no initial aeration step is described and coagulants and flocculants are not added.

The treated water emanating from the dissolved air flotation tank in line 22 is passed through a heat exchanger 30 to transfer reusable heat from the original waste water to the ultimate purified water. In U.S. Pat. No. 4,395,337, the equivalent heat exchange operation precedes the flotation step. Although the order of steps outlined therein may be employed herein, as noted above it is preferred to operate in the illustrated manner to avoid the possibility of fouling of the heat exchanger 30 in periods of upset or other abnormal conditions.

The treated water in line 22 usually has a temperature in the range of about 40° to about 60° C. while, after leaving the heat exchange by line 32, the water stream usually has a temperature in the range of about 20° to about 35° C.

The cooled water in line 32 next passes to a filter 34 to remove substantially any residual suspended solids and turbidity not removed during the dissolved air flotation. The filter 34 may take any desired form, preferably a dual-media filter containing granular anthracite coal placed over sand. Filtration may be effected any desired filtration rate, for example, from about 2 to about 13 m$^3$/hr/m$^2$. The filter media generally have a relatively small diameter to enhance solids removal but not sufficiently small as to cause significant backpressure. For example, the anthracite may have a diameter of about 0.80 to 1.20 mm and the filter sand may have a diameter of about 0.45 to 0.55 mm.

To prevent the accumulation of separated solids in the filter 34 which may otherwise excessively increase the pressure drop and impair the ability of the bed to remove suspended solids, backwashing of the filter 34 may be effected from time to time as required by recycle of filter effluent by line 36 and discharge of backwashed solids with some backwash water by line 38.

The filter effluent in line 40, now substantially free from suspended solids and having decreased turbidity, is passed to an activated carbon adsorption unit 42 to effect removal of organic material from the waste stream. In U.S. Pat. No 4,395,337, the combination of air flotation and ozone treatment are described for organic material removal. Ozonation has been found to decrease oil and grease concentrations but to have no significant effect on total dissolved organic carbon and to produce compounds which cause fouling of the electrodialysis unit. Surprisingly, the use of activated carbon adsorption ensures substantially complete removal of soluble organics from the waste water and hence is employed herein.

In some cases ozonation may be used prior to activated carbon adsorption to oxidize any oil and grease present in the waste water so as to decrease the burn-rate of the activated carbon, but generally removal of organics by activated carbon is more efficient in the absence of ozone treatment and hence is preferred.

The activated carbon adsorption unit 42 may take any convenient form. As the waste water passes through a bed or beds of granular activated carbon, the organic material is adsorbed from the waste water by the carbon particles. The limiting design criteria is the residence contact time required to meet the effluent discharge or water reuse requirement. The pore sites of the carbon bed are continually filled as the waste water passes through the bed and eventually effluent concentrations approach unacceptable levels. The carbon then is replaced with fresh material or regenerated, for example, in a furnace. Backwashing of the activated carbon particles may be effected from time to time using recycled treated water in line 43, with the backwashed solids being discharged with some backwash water by line 45.

The operations of dissolved air flotation, dual media filtration and activated carbon absorption serve to remove substantially all particulates and organic material from the waste water in line 10 to produce a treated water stream in line 44 which is of a quality suitable for feed to an electrodialysis unit 46 for the removal of dissolved ionic species therefrom.

Electrodialysis is a process which effects demineralization by transporting ions in a direct current electric field through alternating cationic and anionic membranes. The aqueous stream in line 40 is separated by electrodialysis in the electrodialysis unit 46 into a concentrated brine stream containing ionic species which leaves the electrodialysis unit 46 by line 48 and an ionic species-depleted stream which leaves the electrodialysis unit 46 by line 50. In the electrodialysis unit 46, the feed water from line 44 passes through compartments formed by the spaces between alternating cation-permeable and anion-permeable membranes held in a stack. Cation-exchange membranes pass positively-charged ions only while anion-exchange membranes pass negatively-charged ions only. The direct current potential applied across the stack causes the positive and negative ions to migrate in opposite directions. Any given ion either migrates to the adjacent compartment or is confined to its original compartment, depending un whether or not it is permeable to the first membrane the ion encounters and, as a result, dissolved solids are concentrated or diluted in alternate compartments.

Fouling of the membranes, thereby impairing the ability of the electrodialysis unit 46 to function correctly, may occur as a result of precipitation of soluble salts, such as calcium carbonate, organic matter and metal oxides. Provision, therefore, is made for periodic membrane cleaning by cleaning chemicals fed by line 52. The cleaning sequence generally involves cleaning with acid solution to remove most of the organic foulants and the metals, followed by cleaning with salt solution to remove the remaining contaminants. The spent cleaning chemicals are discharged from the electrodialysis unit 46 by line 54.

The concentrated brine stream in line 48 and the spent cleaning chemicals are discharged to sewer by line 56 and comprise only a small proportion of the original waste water stream in line 10.

Frequent polarity reversal also may be effected to minimize the build up of precipitates on the membrane and prolong the period of time before chemical cleaning is required. By reversing polarity and process streams, the movement of ions to and through the membranes is reversed, thereby stripping off accumulations of precipitates which may have built up during the previous cycle.

The ionic-species depleted water stream in line 50 is passed to a storage tank 58 to which make-up water is added by line 60 to compensate for the volume of water removed from the original waste water stream in line 10 during the processing operations, mainly during the electrodialysis step. The make-up water may be added at any other convenient location, or may be omitted entirely where the volume of purified water resulting from the process is sufficient for the desired end use. The storage tank 58 is for convenience of operation and may be omitted, if desired.

Water is fed by line 62 to an ion-exchange unit 64 for removal of dissolved ionic species not removed in the electrodialysis unit 46, mainly silica. In the ion-exchange operation, undesirable ions are removed from solution and replaced by more acceptable ions until all the exchange sites on the ion-exchange resin are exhausted. At this point, the resin is regenerated by contacting the resin with a solution containing a high concentration of the acceptable ion fed by line 66 and discharging the undesirable ion. The discharge stream initially has a high concentration of ionic species and is discharged by line 70 while, as the regeneration proceeds, the ionic concentration falls to a value below that acceptable by the electrodialysis unit 46 and is recycled thereto by line 70.

In order to effect complete demineralization of the incoming water stream in line 62, cation and anion exchange resins are required to remove all unacceptable ions and are present in the ion-exchange unit 64. Backwashing of the ion-exchange resins usually is effected prior to regeneration by water fed by line 72 to remove any solids which may have precipitated on the resin. The backwash water is discharged by line 74.

The spent backwash water in line 74 is joined with the effluent stream in line 45 from backwashing the activated carbon, the effluent stream in line 38 from backwashing the dual media•filters and the aqueous effluent in line 26 from alum recovery and solids dewatering to form a combined particulates-containing recycle stream in line 76 which is passed to the dissolved air flotation unit 16.

The regenerant chemical rinse water discharged from the ion-exchange unit 64 is partially recycled by line 70 to line 44 and partially discharged to sewer by line 76, as discussed in more detail below. The discharge effluents from the system in lines 56 and 76 are of relatively low volume compared with the volume of waste water treated and are relatively innocuous liquids requiring no or only little treatment before disposal. A source of service water 78 provides water for a variety of purpose and the volume required is relatively small and is equal to the volume of liquid discharged to sewer by lines 56 and 76.

The electrodialysis unit 46 and/or the ion-exchange unit 64 may be replaced by a reverse osmosis (RO) unit, if desired, to effect demineralization of the waste water in line 44 and/or line 62. The reverse osmosis unit may have any convenient type of RO membrane, including tubular, spiral wound and hollow filter.

The purified and demineralized waste water resulting from the ion-exchange unit 64 is passed by line 80 to a storage tank 82. The storage tanks 58 and 82 enable a continuous flow of waste water to be processed by the system to provide the discharge of a continuous flow of purified water from the system even though periodic cleaning of the electrodialysis unit 46 and periodic regeneration of the ion-exchange unit 64 are required.

Purified waste water is withdrawn from the storage tank 82 and recycled by line 84 to the heat exchanger 30 for recovery of heat from the incoming waste water and thereafter the warmed purified water is forwarded by line 86 to a boiler, after being subjected to deaeration, if desired. Removal of organic contaminants, suspended solids and dissolved solids from the waste water stream in line 10 by the combination of process steps described above ensures that the product water stream in line 86 is suitable for passage to a boiler to form further steam for oil extraction without fouling of the boiler occurring.

The disposal and water demand problems of the current procedures are overcome by the present invention. The water demand is significantly less and the effluents are readily and harmlessly disposed of, in contrast to the prior art.

The waste water treatment system of the invention can incorporate considerable flexibility to ensure that the product purified water stream in line 84 is of uniform quality, even though changes occur in the raw waste water in line 10. The raw waste water characteristics may change for a variety of reasons at various stages of development of a tar sands formation and may vary considerably from one producing field to another. Cyclic operating changes may also cause the concentration of some of the contaminants to fluctuate. For example, during the pressure build-up cycle of the boiler, concentrations of organics and dissolved solids tend to be higher than during blow-down periods, and oil and grease concentrations vary dependent upon the successful operation of the freewater knock-out units. In addition, fluctuations in flow rate also must be accommodated.

The aeration unit 12 may be designed to provide a considerable excess, say 50%, of air over the estimated maximum required under the worst expected conditions, so as to accommodate very poor conditions, such as oil-outs or unusually high sulfide levels. The spray recycle stream 13 may be varied to provide a maximum level capable of controlling the worst foaming conditions.

Sizing of the dissolved air flotation unit 16 is based upon the flow in line 10 of waste water that must be treated and the efficiency of the flotation or settling of the solids in the liquid. The speed of the skimming mechanism may be adjusted to remove various loadings of oil or scum from the surface of the liquid in the dissolved air flotation unit 16. The recycle rate may be operated on an automatic or manual mode and may be adjusted to handle different quantities of solid loadings. To handle conditions of heavier solids loading, the rate of recycle used is higher, so as to maintain a substantially constant air to solids ratio.

The dual-media filtration unit 34 serves mainly as a safety back-up for the dissolved air flotation unit 16 and its operation may not be required at all times, depending on the characteristics of the waste water. The dual-media filtration unit 34 ensures removal of any solids that may pass through the dissolved air flotation unit 16 during upset conditions. The flow rate of the filtration unit 34 may be flexible and backwashing need be performed only when the headloss through the media becomes too great for efficient operation. The frequency of filter backwash depends on the quantity of solids and their loading in the bed.

The capacity of the activated carbon adsorption unit 42 may be designed to be greater than the expected organics loading. A fixed bed or pulsed bed unit may be employed, as desired. The rate of removal of carbon from the unit 42 for a pulsed bed type depends upon the organic loading of the waste water. For periods of heavier loading, the pulse rate may be increased, so as to prevent the effluent TOC concentration from exceeding the desired maximum. The flow rate may be increased to handle greater quantities of waste water without adversely affecting the effluent quality.

A carbon regeneration system may be provided, sized to handle a greater TOC loading than the maximum expected, so as to handle periods when produced waste water has abnormally high TOC levels. For example, when produced waste water from a field undergoing a pressure-up cycle is combined with the produced water tank.

The electrodialysis unit 46 may be provided with built-in flexibility by permitting variations in power level for different dissolved solids concentrations. When ionic concentrations are lower, the overall energy cost is decreased by cutting back on the power level of the electrodialysis unit 46, while during periods of higher total dissolved solids, the energy utilization is increased at the higher power levels. The recovery rate may be adjusted in order to maintain a substantially constant effluent quality. Recycle of some of the effluent to the influent may be effected to result in a lower dissolved solids levels in the effluent, thereby decreasing the demand on the subsequent ion-exchange unit 64 and consequently decreasing the cost of resin regeneration.

The construction of the electrodialysis unit 46 may permit periodic disassembly of the stack of individual sub-units to remove scale or to replace membranes. The stack configuration may be varied to change the quality of the effluent and different types of membranes may be employed at various stages in the stack to provide the desired membrane characteristics for the corresponding quality of water.

The ion-exchange unit 64 may be capable of treating different qualities of electrodialysis effluent with respect to dissolved solids concentrations. The regenerant dosage or the frequency of regeneration may be determined by changes in the level of dissolved solids in the waste water stream 10. When the resin becomes exhausted, the conductivity of the effluent from the ion-exchange unit 64 rises and the column needs to be regenerated using suitable chemicals. During rinse washing to remove remaining regenerant chemicals, the conductivity of the rinse water is high as a result of a high concentration of spent regenerant chemicals and the rinse water must be discharged by line 68. However, as the rinse progresses the conductivity of the rinse water falls until it is less than that of the electrodialysis influent, whereupon the rinse water is switched to flow by line 70 to the electrodialysis unit inflow stream 44. Operation in this manner, with reuse of part of the rinse water, decreases the quantity of service water otherwise required and decreases the quantity of waste water requiring disposal.

The waste water treatment system of the invention can be readily adapted to an existing water treatment facility at a tar sands or other steam-driven heavy oil recovery plant. Existing water softeners may be converted into ion-exchange columns and other equipment, such as storage tanks, filters and piping, may be adapted for use in the system.

Incorporation of a portion of the waste water treatment system into an existing plant using hot lime softening also is feasible. The effluent from the lime softeners may be processed by the sequence of activated carbon adsorption, electrodialysis or reverse osmosis, and ion exchange. In this way, a higher quality water may be produced than the existing water softeners can produce, leading to a decreased requirement for boiler blow-down.

Alternatively, the front end of the waste water treatment system, consisting of aeration, dissolved air flotation, heat exchange and reclamation, and dual media filtration, may be used as a once-through water system, which would realize a short term payback as a result of the energy recoveries.

The waste water treatment system of the invention also has considerable cost advantages in existing plant expansion. Much of the capital cost of the system is offset by the absence of any necessity to increase the existing water treatment system. For example, if the existing water source were capable of providing 30% of the overall water requirement of the expanded plant, additional water supplies would not be needed if the waste water treatment system of the invention were incorporated. In areas where fresh water supplies are not available, a considerable saving in capital cost of the expansion will result.

The type of boiler which is used in the generation of steam for steam extraction of heavy oils may determine the quality requirement of the boiler feedwater. Utilizing the entire waste water treatment system of the invention makes it possible to use a utility style of boiler. However, if a once-through vertical coil boiler were utilized, higher dissolved solids concentration may be tolerated, so that the ion-exchange unit may be omitted. The advantage of a utility boiler, however, is that it is more efficient in fuel usage and water requirements to produce a given amount of steam is lower because of less boiler blow-down.

EXAMPLE

Based on a series of experiments conducted on each of the operations involved, a mass balance of water flows for the system illustrated in FIG 1 was determined for the treatment of waste water from a 20,000 barrels per day tar sands steam extraction process. The flow of waste water to be treated was 3.36 thousand U.S. gallons per day (MGD) (or 12,700 cu.m per day). The following Table II provides the water flows in the various lines in the Figure for the mass balance:

TABLE II

| Line No. | Description | Flow Rate (MGD) |
| --- | --- | --- |
| 10 | Waste water | 3.6 |
| 14 | Aeration effluent | 3.519 |
| 13 | Foam control recycle | 0.34 |
| 76 | Suspended solids recycle | 0.159 |
| 18 | Chemical addition to DAF | 0.027 |
| 20 | Scum removal from DAF | 0.103 |
| 26 | Alum recovery recycle | 0.10 |
| 28 | Solids disposal | 200 cu. ft./day |
| 22,32 | DAF product stream | 3.443 |
| 38 | Dual media filter effluent | Negligible |
| 45 | Activated carbon filter effluent | Negligible |
| 44 | Activated carbon filter product stream | 3.603 |
| 70 | Ion exchange rinse recycle | 0.160 |
| 48 | Electrodialysis effluent | 0.721 |
| 50 | Electrodialysis product stream | 2.882 |
| 60 | Make-up water | 0.797 |
| 62 | Storage tank stream | 3.679 |
| 66 | Ion exchange regeneration chemicals | 0.059 |
| 72 | Ion exchange backwash | 0.059 |
| 68 | Ion exchange rinse effluent | 0.218 |
| 74 | Ion exchange backwash effluent | 0.059 |
| 80,84,86 | Purified water stream | 3.36 |
| 78 | Service water | 0.937 |

As will be seen from the above Table, 3.36 MGD of waste water can be processed to form the same volume of purified water, which is of a quality suitable for reuse, with a service water requirement of 0.937 MGD and the sewering of the same volume of water and the disposal of 200 cu.ft./day of solids as landfill.

SUMMARY OF DISCLOSURE

In summary of this disclosure, the present invention provides method and apparatus for the treatment of waste water from the steam extraction of heavy oils which produces boiler-feed quality water in an efficient manner. Modifications are possible within the scope of this invention.

What we claim is:

1. A method of treating a waste water stream containing dissolved organic material contaminants, suspended solids, occluded organic material and dissolved mineral contaminants, including sulfides, phenol and silica which comprises the sequential steps of:
    (a) aerating said waste water stream to lower the oxidation-reduction potential thereof and to decrease the sulfide and phenol concentrations thereof,
    (b) adding coagulants and flocculants to said aerated waste water stream and effecting dissolved air flotation to remove at least a substantial proportion of said suspended solids and occluded organic material from the waste water stream,
    (c) contacting said waste water stream with activated carbon to effect removal of dissolved organic material contaminants,
    (d) subjecting the waste water stream to electrodialysis or reverse osmosis to effect removal of at least a substantial proportion of the dissolved mineral contaminants with the exception of silica, and
    (e) subjecting the waste water stream to ion exchange to effect removal of substantially any residual dissolved mineral contaminants and silica to form a reusable water stream.

2. The method of claim 1, wherein the waste water stream has a yellow colour and a pH of about 6.30 to about 7.90 and said aeration is effected sufficiently to alter the colour of the waste water stream to brown and to raise the pH value to within the range of about 7.80 to about 8.40.

3. The method of claim 1 including maintaining foam control during said aeration step by recycling a portion of the effluent from the aeration step to the influent to the aeration step.

4. The method of claim 1 wherein said coagulants and flocculants include alum, the solids separated in said dissolved air flotation are recovered, alum is recovered from said recovered separated solids, said recovered separated solids are dewatered and dewatered solids are discharged, and recovered alum is recycled to the dissolved air flotation step.

5. The method of claim 1 wherein said waste water stream has a temperature sufficiently elevated to enable heat to be recovered therefrom by heat exchange and said waste water stream is subjected to a heat exchange operation to recover heat therefrom following said dissolved air flotation step and prior to said activated carbon adsorption step.

6. The method of claim 5 wherein said heat exchange is effected using the purified waste water stream.

7. The method of claim 5 including subjecting the waste water stream to filtration to remove residual suspended solids therefrom following said dissolved air flotation step and prior to said activated carbon adsorption step.

8. The method of claim 1 including periodically cleaning at least one membrane used in said electrodialysis or reverse osmosis step, and periodically regenerating at least one ion-exchange resin used in said ion exchange step.

9. The method of claim 8 including storing treated waste water following said electrodialysis or reverse osmosis step and before said ion exchange step and adding make-up water to the treated waste water while stored to result in a flow rate of purified water from the waste water treatment method substantially equal to that of waste water to the waste water treatment method.

10. A method of treating a waste water stream containing dissolved organic material contaminants, suspended solids and occluded organic material, which comprises the sequential steps of:

aerating said waste water stream, adding coagulant and flocculant chemicals to said waste water stream, subjecting said waste water stream to dissolved air flotation to remove, in the presence of said coagulant and flocculant chemicals, at least a substantial proportion of said suspended solids and occluded organic material from the waste water stream, filtering said waste water stram to remove residual suspended solids from the waste water stream, and subjecting said waste water stream to activated carbon adsorption to remove said dissolved organic material contaminants therefrom.

11. The method of claim 10 including subjecting said waste water stream to heat exchange to recover heat therefrom following said dissolved air flotation step and prior to said activated carbon adsorption step.

12. A continuous method of treating a waste water stream containing organic material contaminants including occluded organic material, suspended solids and dissolved mineral contaminants including silica to form a purified water stream, which comprises the sequential steps of:

aerating said waste water stream to ensure that the waste water stream is in an oxidized state, adding flocculants and coagulants to said waste water stream, subjecting the aerated waste water stream to dissolved air flotation in the presence of said flocculants and coagulants to remove at least a substantial proportion of the suspended solids and occluded organic material from the aerated waste water as a discrete solids phase, removing the discrete solids phase from the resulting suspended solids-depleted waste water stream to provide a purified water stream, dewatering the solids phase to form a dewatered solids discharge stream and an aqueous recycle stream, passing the suspended solids-depleted waste water stream into heat exchange relationship with the purified water stream to remove heat from said suspended solids-depleted waste water stream and to heat saidd purified water stream, subjecting the so-cooled suspended solids waste water stream to filtration to remove substantially residual suspended solids to form a filtered waste water stream, subjecting the filtered waste water stream to activated carbon adsorption to remove substantially said organic material contaminants from said filtered waste water stream and form a dissolved minerals-contaminated waste water stream, subjecting the dissolved minerals-contaminated waste water stream to electrodialysis or reverse osmosis to remove substantially dissolved mineral contaminants other than silica from the waste water stream and form a minerals concentrate for discharge and a mineals-depleted water stream, subjecting the minerals-depleted water stream to ion-exchange to remove sustantially any residual dissolved mineral contaminants and silica therefrom and form a minerals concentration for discharge and the purified water stream, and forwarding the purified water stream to the heat exchange step.

13. The method of claim 12 wherein said waste water stream is obtained in the steam extraction of heavy oils from subterranean deposits and said purified water stream is reused in steam generation for use in said steam extraction.

14. The method of claim 13 wherein alum is used as a coagulant and/or flocculant chemical in said dissolved air flotation step, alum is recovered from sid discrete solids phase, and recovered from said discrete solids phase, and recovered alum along with said aqueous recycle stream is recycled to the dissolved air flotation step.

15. The method of claim 14 wherein the at least one membrane used in said electrodialysis or reverse osmosis step is cleaned periodically to remove contaminants therefrom and to discharge a spent chemicals stream.

16. The method of claim 15 wherein the at least one ion-exchange resin used in said ion-exchange step is regenerated periodically to discharge a spent chemicals stream having a first minerals content and to form a recycle spent chemicals stream having a lower minerals content than said spent chemical stream, and recycling said recycle spent chemicals stream to said electrodialysis or reverse osmosis step.

17. The method of claim 16, wherein said minerals-depleted water stream is passed to storage prior to subjection to ion exchange, make-up water is added to said storage to make up for the volume of water in said waste water stream which is discharged during the waste water treatment method, so that the flow rate of purified water to the heat exchange step is substantially equal to the flow rate of waste water to the aeration step.

18. The method of claim 17, wherein said purified water is passed to storage and the purified water stream forwarded to the heat exchange step is removed from said storage.

19. The method of claim 18 wherein said waste water stream contains sulfide and phenol, is in a reduced form and has a pH of about 6.30 to about 7.90 and said aeration is effected to lower the oxidation-reduction potential of the waste water stream, raise the pH to about 7.80 to about 8.40, and to decrease the concentrations of sulfide and phenol.

* * * * *